(12) United States Patent
Comerford et al.

(10) Patent No.: US 7,962,340 B2
(45) Date of Patent: Jun. 14, 2011

(54) METHODS AND APPARATUS FOR BUFFERING DATA FOR USE IN ACCORDANCE WITH A SPEECH RECOGNITION SYSTEM

(75) Inventors: Liam D. Comerford, Carmel, NY (US);
David Carl Frank, Ossining, NY (US);
Burn L. Lewis, Ossining, NY (US);
Leonid Rachevksy, Ossining, NY (US);
Mahesh Viswanathan, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 993 days.

(21) Appl. No.: 11/209,004

(22) Filed: Aug. 22, 2005

(65) Prior Publication Data

US 2007/0043563 A1    Feb. 22, 2007

(51) Int. Cl.
*G10L 15/04* (2006.01)
*G10L 17/00* (2006.01)
*G10L 11/06* (2006.01)

(52) U.S. Cl. ......... 704/253; 704/248; 704/210; 704/215
(58) Field of Classification Search .................. 704/215, 704/248, 253, 210; 386/124, 125
See application file for complete search history.

(56) References Cited

U.S. PATENT DOCUMENTS

| | | | |
|---|---|---|---|
| 4,696,039 A | 9/1987 | Doddington | |
| 5,197,113 A | 3/1993 | Mumolo | |
| 5,276,765 A | 1/1994 | Freeman et al. | |
| 5,611,019 A | 3/1997 | Nakatoh et al. | |
| 5,774,849 A | 6/1998 | Benyassine et al. | |
| 5,809,455 A | 9/1998 | Nishiguchi et al. | |
| 5,822,726 A | 10/1998 | Taylor et al. | |
| 5,966,688 A | 10/1999 | Nandkumar et al. | |
| 5,978,756 A | 11/1999 | Walker et al. | |
| 6,006,176 A | 12/1999 | Hayata | |
| 6,173,260 B1 | 1/2001 | Slaney | |
| 6,216,103 B1 * | 4/2001 | Wu et al. | 704/253 |
| 6,233,550 B1 | 5/2001 | Gersho et al. | |
| 6,249,757 B1 | 6/2001 | Cason | |
| 6,324,509 B1 | 11/2001 | Bi et al. | |
| 6,711,536 B2 * | 3/2004 | Rees | 704/210 |
| 6,782,363 B2 | 8/2004 | Lee et al. | |
| 6,873,953 B1 | 3/2005 | Lennig | |
| 7,035,793 B2 | 4/2006 | Jiang et al. | |
| 7,127,392 B1 | 10/2006 | Smith | |
| 7,148,225 B2 | 12/2006 | Gao et al. | |

(Continued)

OTHER PUBLICATIONS

Li et al. "Robust Endpoint Detection and Energy Normalization for Real-Time Speech and Speaker Recognition," IEEE, Trans. on speech and audio processing, vol. 10, pp. 146-157, 2002.*

(Continued)

*Primary Examiner* — James S Wozniak
*Assistant Examiner* — Jialong He
(74) *Attorney, Agent, or Firm* — Wolf, Greenfield & Sacks, P.C.

(57) ABSTRACT

Techniques are disclosed for overcoming errors in speech recognition systems. For example, a technique for processing acoustic data in accordance with a speech recognition system comprises the following steps/operations. Acoustic data is obtained in association with the speech recognition system. The acoustic data is recorded using a combination of a first buffer area and a second buffer area, such that the recording of the acoustic data using the combination of the two buffer areas at least substantially minimizes one or more truncation errors associated with operation of the speech recognition system.

18 Claims, 4 Drawing Sheets

U.S. PATENT DOCUMENTS

| | | | |
|---|---|---|---|
| 7,216,075 | B2 | 5/2007 | Takagi |
| 7,231,346 | B2 | 6/2007 | Yamato |
| 7,277,853 | B1* | 10/2007 | Bou-Ghazale et al. ........ 704/248 |
| 7,412,376 | B2* | 8/2008 | Florencio et al. ............. 704/206 |
| 2001/0012998 | A1 | 8/2001 | Jouet et al. |
| 2002/0111798 | A1 | 8/2002 | Huang |
| 2002/0116186 | A1 | 8/2002 | Strauss et al. |
| 2002/0152069 | A1 | 10/2002 | Gao et al. |
| 2002/0196911 | A1 | 12/2002 | Gao et al. |
| 2003/0061036 | A1* | 3/2003 | Garudadri et al. ............ 704/208 |
| 2003/0078770 | A1 | 4/2003 | Fischer et al. |
| 2003/0144844 | A1 | 7/2003 | Colmenarez et al. |
| 2003/0228140 | A1* | 12/2003 | Bullock et al. ............... 386/125 |
| 2004/0015352 | A1 | 1/2004 | Ramakrishnan et al. |
| 2004/0024593 | A1 | 2/2004 | Tsuji et al. |
| 2004/0042103 | A1* | 3/2004 | Mayer .............................. 360/7 |
| 2004/0064314 | A1 | 4/2004 | Aubert et al. |
| 2004/0133420 | A1 | 7/2004 | Ferris et al. |
| 2004/0210436 | A1 | 10/2004 | Jiang et al. |
| 2006/0241948 | A1* | 10/2006 | Abrash et al. ................. 704/275 |

OTHER PUBLICATIONS

Wang et al. "Feature extraction and dimensionality reduction algorithms and their applications in vowel recognition" Pattern Recognition, 2003.

* cited by examiner

METHODS AND APPARATUS FOR BUFFERING DATA FOR USE IN ACCORDANCE WITH A SPEECH RECOGNITION SYSTEM

FIELD OF INVENTION

The present invention relates generally to speech processing systems and, more particularly, to speech recognition systems.

BACKGROUND OF THE INVENTION

Speech recognition systems may be described in terms of several properties including whether they use discrete word vocabularies (typical of large vocabulary recognizers) or grammar-based vocabularies (typical of small vocabulary recognizers), and whether they continuously process an uninterrupted stream of input audio or commence processing on command (typically a "microphone on" or "MICON" event). Recognizers that use control events may terminate recognition on an external event (typically a "microphone off" or "MICOFF" event), completion of processing of an audio buffer, or detection of silence in the buffered audio data. The processed audio stream in any case may be "live" or streamed from a buffer.

It is a common problem of continuously operated recognition systems that they generate large numbers of errors of recognition and spurious recognition output at times that the recognition system is not being addressed. For example, in a vehicle-based speech recognition system, this problem may occur due to audio from the radio, person-to-person conversation, and/or noise. This fact makes the use of a microphone button or other dialog pacing mechanism almost universal in automotive (telematic) speech recognition applications.

It is a common problem of microphone-button paced speech applications that the application user fails to operate the button correctly. The two typical errors are completing the pushing of the microphone-on button after speech has already begun and releasing the microphone-on button (or pushing the microphone-off button) before speech has ended. In either case, some speech intended to be recognized is being cut off due to these errors of operation by the user.

Accordingly, techniques for overcoming errors in speech recognition systems are needed.

SUMMARY OF THE INVENTION

Principles of the present invention provide techniques for overcoming errors in speech recognition systems.

It is to be understood that any errors that may occur in a speech recognition system that could cause loss of speech intended to be recognized will be generally referred to herein as "truncation errors." While two examples of user operation failure in microphone-button paced speech applications are given above, it is to be understood that the phrase "truncation error" is not intended to be limited thereto.

In one aspect of the invention, a technique for processing acoustic data in accordance with a speech recognition system comprises the following steps/operations. Acoustic data is obtained in association with the speech recognition system. The acoustic data is recorded using a combination of a first buffer area and a second buffer area, such that the recording of the acoustic data using the combination of the two buffer areas at least substantially minimizes one or more truncation errors associated with operation of the speech recognition system.

It is to be appreciated that the data structures types chosen for each of the buffer areas reflect the functions of those areas. By way of example, the first buffer type may be chosen to allow continuous recording so that the most recent few seconds (depending on the buffer size) of acoustic data is available for processing. Data structures such as circular or ring buffers and FIFO (First In First Out) stacks are suitable examples. The second buffer type may be chosen to ensure that the system will not run out of buffer space when recording long utterances. Linked lists or appropriately large memory blocks are exemplary data structures for implementing such buffers.

It is to be further appreciated that the acoustic data referenced here may be, by way of example, digital representations of speech and other audio signals present at a system input microphone. It is, in any case, data comprising acoustic features or data in a format that is suitable for extracting acoustic features, as is well known in the art. Such features may be used to determine whether speech was taking place at the time of the recording or not. Further, such data may be decoded into text that represents the words uttered by the user to create a part of the acoustic data.

In one embodiment, the recording step/operation may further comprise: recording acoustic data obtained by the speech recognition system in the first buffer area; stopping recording of acoustic data in the first buffer area and starting recording of acoustic data obtained by the speech recognition system at the start of the second buffer area, when an indication that the speech recognition system is being addressed is detected; and prepending, to the beginning of the acoustic data stored in the second buffer area, acoustic data in the first buffer. This data may be arranged so that the oldest acoustic data in the first buffer is located at the start of the segment prepended to the second buffer. This means that the acoustic data recorded immediately before the indication that the system is being addressed ends the prepended segment and is contiguous in memory with the acoustic data which immediately followed the "being addressed" event that is stored in the second area.

The technique may further comprise processing the acoustic data in the composite buffer area (prepended area and second buffer area) to detect features indicating silence. The location of the silence closest to the end of the prepended segment may then be used as the location in the composite buffer at which speech intended for the system to process begins. This silence will be in the prepended segment if the indication of speech was given after speech started. It will follow the end of the prepended segment if speech began after the indication event.

The technique may further comprise decoding acoustic data in the composite buffer area from the acoustic data format into text. The decoding of acoustic data in the composite buffer area may begin when the starting silence location has been established from the acoustic data.

The recording of acoustic data in the second buffer area may continue until an indication that the speech recognition system is no longer being addressed is detected and a silence indication is detected in the acoustic data recorded in the second buffer area. Recording of acoustic data in the second buffer area may stop and recording of acoustic data in the first buffer area may restart, when the indication that the speech recognition system is no longer being addressed is detected and the silence indication is detected in the acoustic data recorded in the second buffer area.

The indication that the speech recognition system is being addressed may comprise a microphone on event, and the indication that the speech recognition system is no longer being addressed may comprise a microphone off event.

The first buffer area may comprise a circular buffer, and the second buffer area may comprise a linear buffer. Further, the first buffer area and the second buffer area may be at least part of a single storage data structure, or may be at least part of separate storage data structures. These buffers may be in addition to any buffer resources maintained by the speech recognizer.

In another embodiment, the recording step/operation may further comprise: recording acoustic data obtained by the speech recognition system in the first buffer area; appending acoustic data recorded in the first buffer area to the second buffer area, when the first buffer area is full; identifying the existence of a speech region and a silence region in the acoustic data appended to the second buffer area; detecting when an indication that the speech recognition system is being addressed occurs; and filling a recognition buffer area at least with the acoustic data appended to the second buffer area, when a speech region is identified and when the indication that the speech recognition system is being addressed is detected, or filling the recognition buffer area at least with incoming acoustic data for the speech recognition system, when a silence region is identified and when the indication that the speech recognition system is being addressed is detected.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
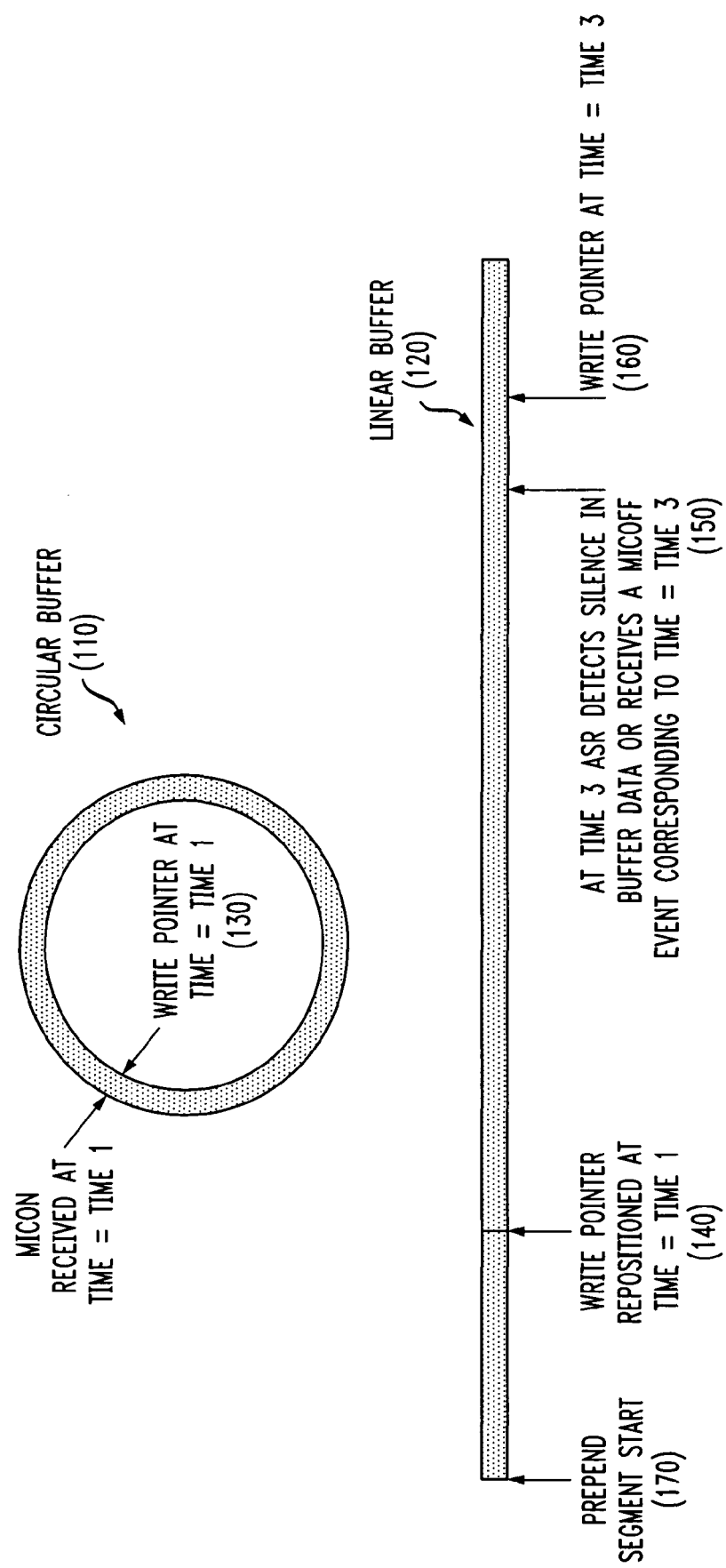
FIG. 1 is a diagram illustrating an anti-truncation buffering methodology, according to an embodiment of the invention.

It is to be understood that while the present invention may be described below in the context of a particular computing system environment and an illustrative speech recognition application, the invention is not so limited. Rather, the invention is more generally applicable to any computing system environment and any speech recognition application in which it would be desirable to overcome truncation errors.

As used herein, the phrase "acoustic data" generally refers to any acoustic input picked up and transduced by a microphone of the Automatic Speech Recognizer (ASR) including, but not limited to, acoustic input representative of speech and acoustic input representative of silence. Depending on the requirements or features of a particular implementation, acoustic data may refer to compressed audio, audio that has undergone feature extraction and is represented, for example, as cepstra or any other digital representation of audio that that is suitable for silence detection and decoding into text.

As will be explained below, illustrative embodiments of the invention address the truncation error problem by means by of a software apparatus employing the "silence detection" capability of an automatic speech recognizer, an audio buffer arrangement, a buffer management algorithm and the events generated by microphone mechanisms that signal the user's intention to address the system such as "Push-to-Talk" or "Push-for-Attention" buttons.

When a "Push-to-Talk" button is employed in an apparatus containing an ASR, button depression typically causes a "MICON" event, and button release typically causes a "MICOFF" event. When a "Push-for-Attention" button is employed in an apparatus containing an ASR, button depression typically causes a "MICON" event, and button release typically does not produce any event. Other mechanisms such as video speech recognition may imitate either of these patterns.

Conventional ASRs provide "alignment" data that indicate which parts of an audio stream or buffer has been recognized or decoded into which particular words or silence.

In a conventional ASR, audio to be recognized begins to be stored in buffer memory upon receipt of the MICON message and ceases to be stored upon receipt of the MICOFF message. In accordance with illustrative principles of the invention, the acoustic data, which may include speech by the user, is continuously recorded in a circular buffer. That is, acoustic data is continuously picked up by the microphone of the ASR and is continuously stored in the buffer arrangement of the invention, as will be explained in detail below, regardless of the receipt of a MICON event or a MICOFF event (as will be seen, such events serve to trigger which buffer of the buffer arrangement does the storing).

As is known, the terms "circular buffer" or "ring buffer" refer to a commonly used programming method in which a region of memory is managed by a software module so that when the region has been filled with incoming data, new data is written beginning again at the start of the memory region. The management software retains the address of the current "write" location and the locations of the beginning and end of the memory region. Any portion of the memory region may be read. This permits the management software to read the data from the memory region as a continuous stream, in the correct order, even if, when the region is viewed as a linear segment of memory, the end of the data appears at a lower memory address than the start of the data. The effective topology of the memory region is thus made into a ring by the managing software. In contrast, a "linear buffer" typically does not have such a wrapping feature, and thus when the end of the buffer is reached, the processor must allocate additional buffer space.

Accordingly, in accordance with illustrative principles of the invention using a circular buffer and a linear buffer, upon receipt of the MICON message, the ASR and the software system of this invention proceed to:

1. mark the point in the circular buffer corresponding to the time at which the MICON was received by storing the address of that memory location and halt recording in that buffer, 2. buffer all further speech in a separate linear buffer, and;

3. prepend linear copy of circular buffer to linear buffer.

4. process the resulting composite buffer until the silence closest to the MICON marker is found.

The silence found in step 4 is taken to be the start of the utterance.

Depending on the particular ASR configuration, decoding into text may now proceed or be postponed until the MICOFF message is received or silence is detected in the most recently buffered audio. In either case, the audio buffer of step 2 continues to store additional acoustic data until both a detected silence occurs and a MICOFF message is received.

At detection of the terminal silence, and MICOFF event, recording re-commences in the circular buffer.

By these means, the meaning of MICON and MICOFF messages are converted into indications of the approximate time segment of speech to be decoded, and the exact boundaries of that period are determined using the silence detection features of the ASR. The silence detection feature of ASRs, such as the Embedded ViaVoice™ product available from IBM Corporation (Armonk, N.Y.), operates in parallel with the speech to text decoding functions so, at the point that the MICOFF and silence condition has been met, the speech sounds have also been decoded to text and are available for use by application software or dialog managers or other software components.

Referring initially to FIG. 1, a diagram illustrates an anti-truncation buffering methodology, according to an embodiment of the invention. It is to be understood that illustrative principles of the invention operate in the context of a computing system containing an acoustic signal capture and encoding capability. Software embodying the invention provides the means for directing the encoded audio into a circular buffer 110 or a linear buffer 120 by changing the value of a Write Pointer (shown as 130 for the circular buffer and 140 for the linear buffer) to indicate the next available memory address within a buffer's address range.

Thus, as illustrated in FIG. 1, audio recording into the circular buffer has taken place for as long as the system has been turned on. At time 1, a MICON event is received. User speech may have begun prior to this event or may follow this event. The write pointer originally pointing to a position (130) in circular buffer 110 is then repositioned to point to a position (140) in linear buffer 120.

A linear copy of the circular buffer is prepended to the linear buffer (170). The data in this linear copy is arranged so that the oldest acoustic data in the circular buffer is located at the start of the segment prepended to the second buffer. This means that the acoustic data recorded immediately before the indication that the system is being addressed ends the prepended segment and is contiguous in memory with the acoustic data which immediately followed the MICON event that is stored in the second area.

The resulting composite buffer is searched for acoustic data representing silence. The location of the silence closest to the end of the prepended segment may then be used as the location in the composite buffer at which speech intended for the system to process begins. This silence will be in the prepended segment if the indication of speech was given after speech started. It will follow the end of the prepended segment if speech began after the MICON event.

The ASR may now start decoding (into text) the content of the augmented linear buffer from the address of the first detected silence. Later, at say time 3, the ASR detects silence (150) in the linear buffer data or receives a MICOFF event corresponding to time 3. As shown, at time 3, the write pointer points to a position (160) in the linear buffer since the encoded audio continues to be written as the ASR decodes.

Figure 2:
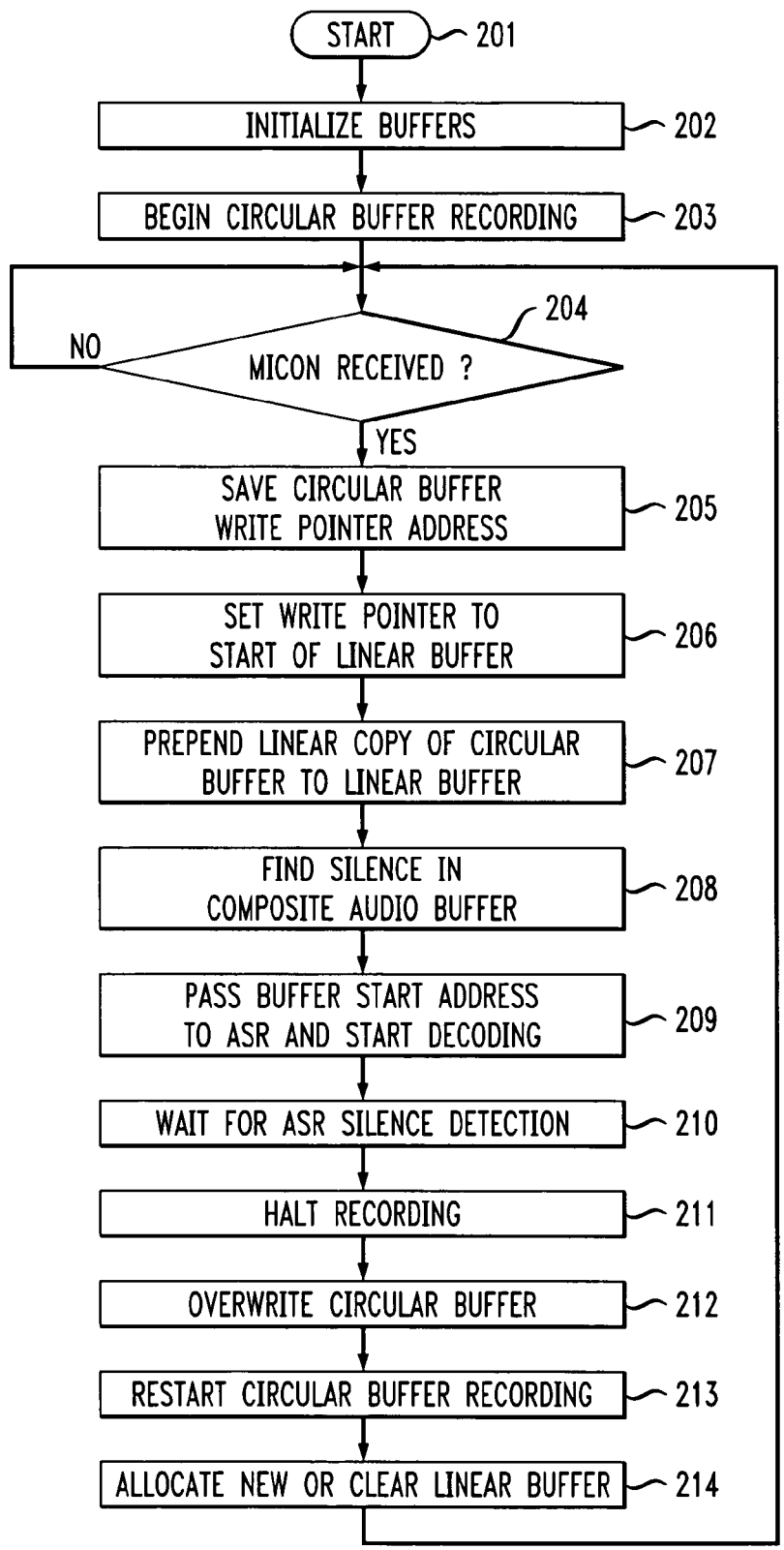
FIG. 2 is a flow diagram illustrating more details of an anti-truncation buffering methodology, according to an embodiment of the invention.

Referring now to FIG. 2, a more detailed flow diagram illustrates an anti-truncation buffering methodology, according to an embodiment of the invention.

In step 201, the methodology is started.

In step 202, a set of buffers (a circular buffer and a linear buffer) and their low-level support software are instantiated. The specification and programming support for such buffers and low-level support is well known to those of ordinary skill in the art. The circular buffer is of fixed size so that its oldest content is continually being over-written by the most recently captured acoustic signal. The linear buffer and its support are arranged to permit additional buffer space to be concatenated to the end of the buffer at any time the buffer runs low on space for recording.

In step 203, recording into the circular buffer begins. This completes the initialization phase.

In step 204, the methodology waits for a "MICON" event or signal or otherwise tests for the indication the user is addressing the system, by the means provided in the specific implementation of the system. If no event or indication is present, the methodology remains at step 204. Otherwise, in the presence of an indication or event or message, the system proceeds to 205.

In step 205, the memory location of the Write Pointer in the circular buffer is stored for later use.

In step 206, the value of the Write Pointer is changed to the memory address of the start of a linear buffer, at which location audio recording continues without interruption. This is possible because the process of encoding the audio into a form which can be stored in digital computer memory requires computing on digital samples acquired at a rate of several tens of thousands a second while modem computers are capable of several billion operations a second. There is, therefore, a surplus of time available to switch storage locations (change the Write Pointer) without interrupting the receipt or encoding or recording of the audio signal.

In step 207, a linear copy is made of the circular buffer segment. This copy begins at the oldest recoding (from the address of the write pointer in the circular buffer, stored in step 205) and continues using data from the circular buffer until the address in the circular buffer which immediately precedes the write pointer address is reached. This copy buffer is then prepended to the linear buffer so the location in the copy buffer corresponding to the last data written into the circular buffer is contiguous with the first location in which data has been written into the linear buffer. Alternatively, the copy of the circular buffer could be made into memory space immediately preceding the linear buffer which had been allocated for the purpose of making the copy buffer.

In step 208, the audio in the composite buffer is decoded by the silence detection mechanism of the ASR. The "alignment" data of the ASR is used to determine the beginning memory address of the silence that is in closest temporal proximity to the MICON event. The address of the silence closest to the end of the prepended segment may then be used as the address in the composite buffer at which speech intended for the system to process begins. This silence will be in the prepended segment if the indication of speech was given after speech started. It will follow the end of the prepended segment if speech began after the indication event. This address is stored for later use.

In step 209, the start address found in step 208 is passed to the ASR with the instruction to begin decoding.

In step 210, the ASR or some other mechanism detects that the user has stopped speaking for long enough to signal that the utterance is complete.

In step 211, the linear buffer recording is halted. At some time after this, the ASR returns the results of the recognition process through a channel created in another part of the application. This return is not a focus of the invention.

In step 212, the circular buffer is overwritten with values that cannot be misrecognized as silence and, in step 213, the recording process begins again.

In step 213, either the old linear buffer is cleared or a new buffer is allocated with a "pre-pend" segment (e.g., segment between arrows 170 and 140 in FIG. 1) long enough to hold the complete contents of the circular buffer. Control is then returned to step 204 so that the anti-truncation buffering functionality can be used for the next utterance.

The above embodiment has been described in terms of a circular buffer of fixed size, a linear buffer that can be extended, a microphone button supplying a "MICON" signal and an automatic speech recognizer with a silence detection feature. It should be understood that other configurations of buffers and other buffer segment selection mechanisms may be realized by those of ordinary skill in the art and could be applied to implementing this invention without departing from the spirit of the invention. These include, but are not limited to, single buffer configurations which are expanded or changed in topology when "MICON" or its equivalent is detected, multiple buffer configurations in which new allocation plays a reduced or nonexistent role, mechanisms which detect that speech is being directed to the recognition system without the use of a "microphone button," configurations which use First In First Out (FIFO) stacks in hardware or software in place of the circular buffer and utterance absence detection mechanisms other than acoustic silence detection.

An alternative embodiment of the invention is described below.

In this alternative embodiment, a large circular buffer is allocated when the program is started. This buffer is longer than the longest expected user utterance. For practical purposes, the buffer may hold approximately 100 seconds of recorded speech. For the purpose of discussion, an ASR capable of providing several services is assumed. These include the capability to convert analog audio signals into a digital format such as pulse code modulated (PCM) format, the ability to detect (within some several hundreds of milliseconds) when speech sounds have begun and when they have ended, and the ability to decode PCM stored in a memory buffer into a text representation of the speech audio stored in that buffer. The Embedded ViaVoice™ speech recognition engine from IBM Corporation (Armonk, N.Y.) is a currently commercially available ASR with these capabilities. That is, the ASR adapted for use in the embodiments of FIGS. 1 and 2 may be adapted for use here as well.

Figure 3:
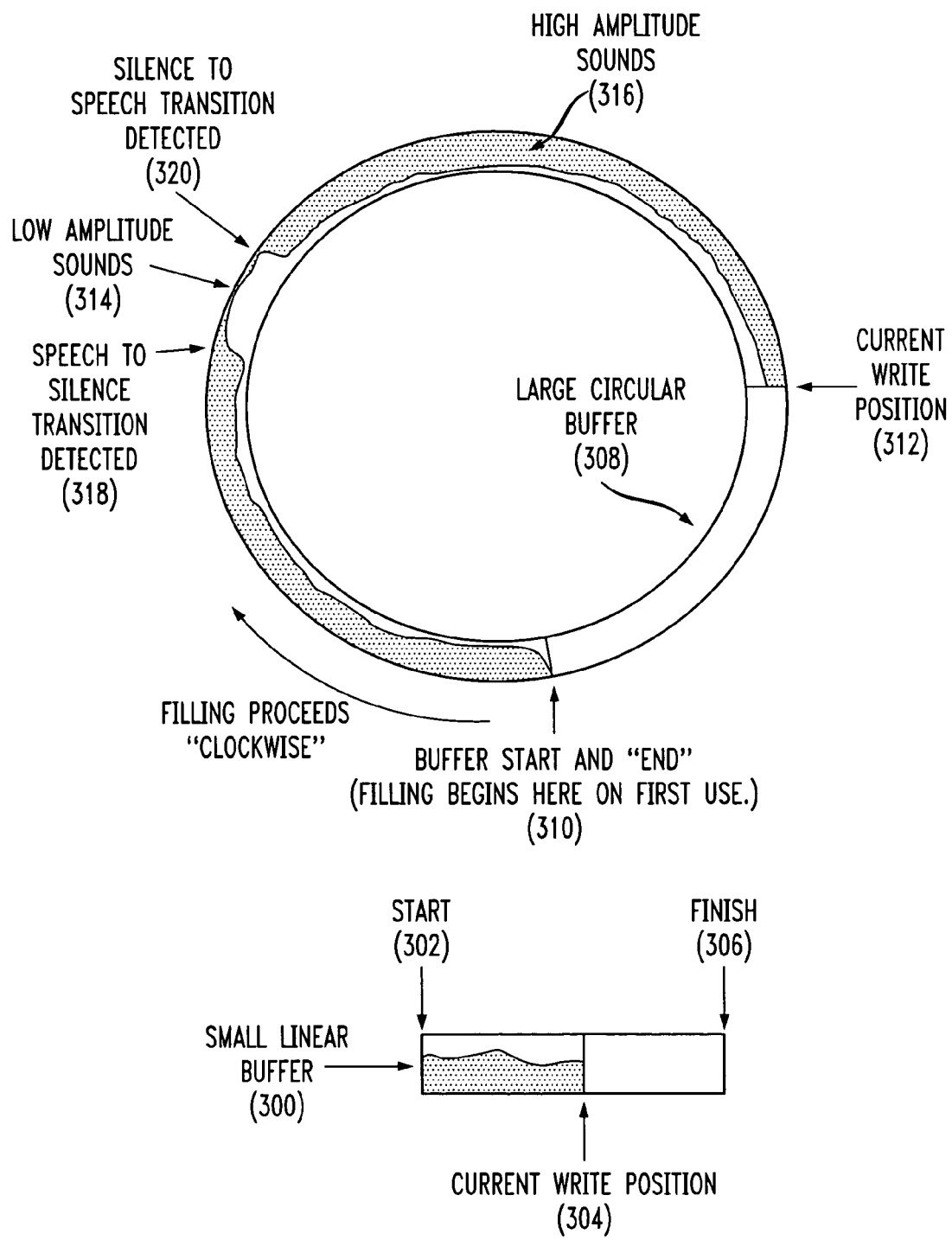
FIG. 3 is a diagram illustrating an anti-truncation buffering methodology, according to another embodiment of the invention.

Referring now to FIG. 3, a diagram illustrates the anti-truncation buffering methodology according to another embodiment of the invention. As in the embodiment above, data structures called buffers are used in order to capture and retain audio signals so that a memory buffer with a complete recording of a user utterance can be supplied to the ASR for decoding into text. The data structures allocated at initialization are the linear buffer 300 and the circular buffer 308. Buffers, as is well understood in the art, are associated with data structures which are used to keep track of the buffer start (302, 310), finish (306, 310), and current writing location (304, 312) along with other management data.

In operation, the ASR is used to capture speech in a form suitable for later recognition. It is typical for an ASR to deal with short frames of speech audio. In the case of the IBM Embedded ViaVoice™ ASR, these frames are 100 milliseconds in length. In order to preserve the captured audio for later use, the ASR is provided with a linear buffer in which it stores audio until the buffer is filled. A signal, referred to as a "callback," is used to trigger a software component that transfers the content of the small linear buffer to the next appropriate location in the large circular buffer.

Figure 4:
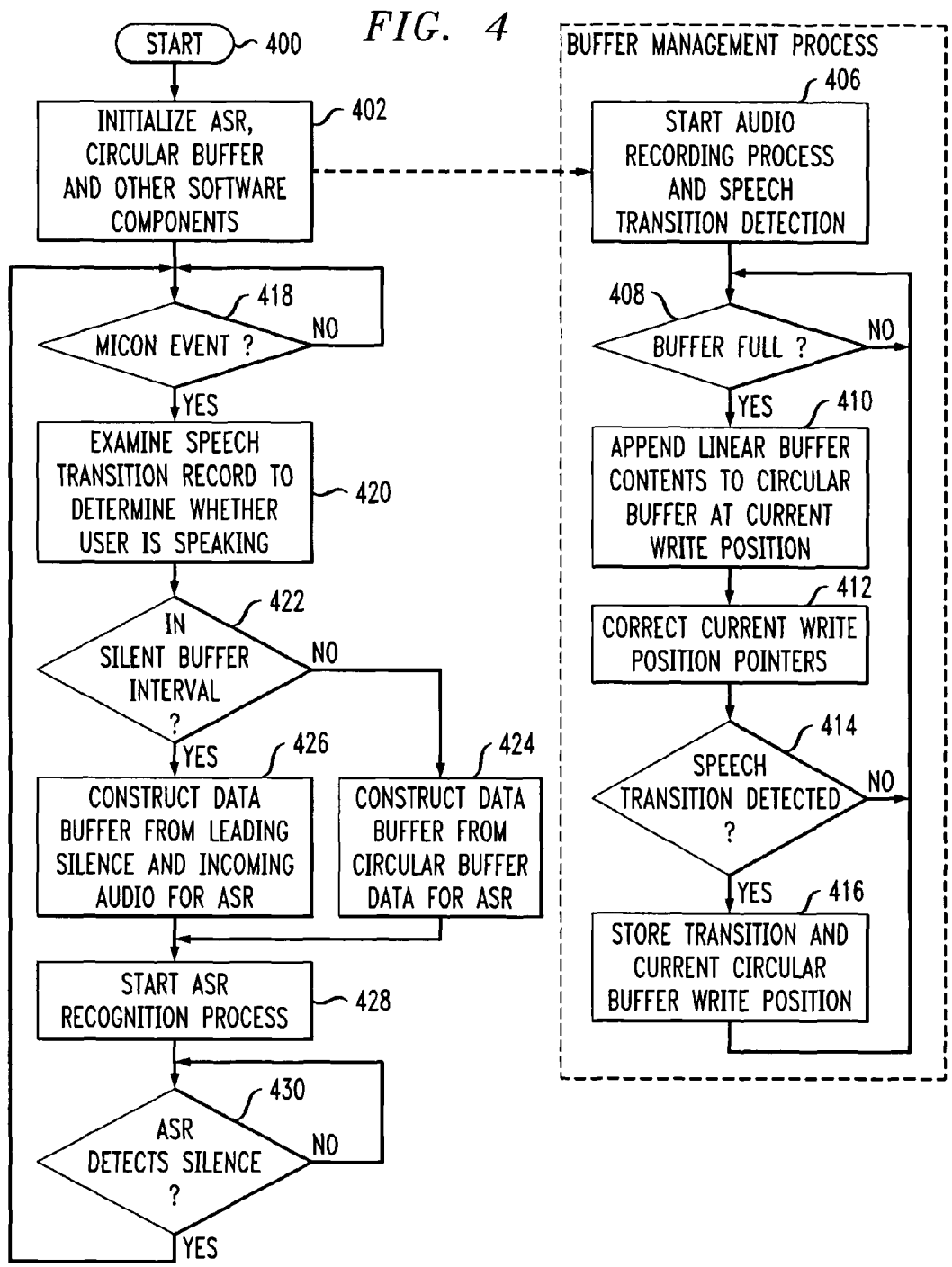
FIG. 4 is a flow diagram illustrating more details of an anti-truncation buffering methodology, according to another embodiment of the invention.

Operation of the invention can be understood by considering several computer processes that are carried on "simultaneously" in "threads," in the sense used by those with ordinary skill in the art of computer programming. These processes and operation of the invention are described below in the context of FIGS. 3 and FIG. 4.

The software instantiating this invention begins at step 400.

In step 402, the software components supporting the invention (the ASR) and the software components comprising the invention are initialized. For example, in the case of the IBM Embedded ViaVoice ASR product, part of the initialization includes making Application Programmers Interface (API) calls to the ASR to cause it to allocate and the small linear buffer 300.

An API call is made in step 406 to cause the ASR to begin its audio recording function using the linear buffer 300. This buffer 300 fills until the current write location 304 corresponds to the buffer finish location 306. When this condition is detected, in step 408, a callback is generated to a function 410 that appends the content of buffer 300 to the content of buffer 308 at location 312.

Function 412 then sets the linear buffer 300 current write location 304 to equal the buffer start 302. This switch is accomplished in less time than is required by the ASR to process the next frame of speech so the change in write location has no effect on the continuity or integrity of the recorded data. The same function 412 advances the circular buffer current write location 312 to the location corresponding to the end of the newly appended frame.

In step 414, the ASR is queried to determine whether a transition from speech sounds to silence 318 or from silence to speech sounds 320 occurred as detected in the last few frames. If either kind of transition was detected, then the frame number and circular buffer location of the transition is stored for later use. A region of the buffer between a silence to speech transition and a speech to silence transition is called a "speech region." The fact that the last two transitions are a speech to silence transition followed by a silence to speech transition indicates that the buffer is currently recording into a "speech region," while the opposite order indicates that it is currently recording into a "silence region."

Once started, the process loop initiated at step 408 continues to maintain and refresh the audio buffers until shutdown.

The process that utilizes the data stored in the circular buffer (starting at step 402) continues, in step 418, where the software waits (shown as looping) until the user signals the intention to speak to the application by depressing the microphone or attention button. This causes the record of speech to silence and silence to speech transitions buffer locations to be examined, in step 420, to determine whether the buffer recording is currently in a speech region or a silence region.

At step 422, either of two methods of preparing a buffer of speech to be recognized is chosen based on the kind of region the buffer is currently recording into. If the buffer was in a silence region, then the user (correctly) pressed the microphone button before starting to speak. In this case, in step 426, a new buffer is allocated and filled with a leading interval of silence and with all the audio buffered since the microphone button depression was detected. The ASR recognition process is then started, in step 428, to decode that audio into text. All new audio is also placed in this buffer as it arrives until, in step 430, the ASR detects a speech to silence transition and halts the recognition process.

If, in step 422, it is determined that the buffer was in a speech region when the microphone button was depressed, then the new buffer is filled with an appropriate amount of silence from the preceding silence region and all of the audio recorded from the end of the silence region to the current write location. All new audio is also placed in this buffer as it arrives until, in step 430, the ASR detects a speech to silence transition and halts the recognition process. When silence is detected at step 430, the software returns to step 418 to wait for the next microphone button depression.

It is to be appreciated that many variations in the details of this method are possible without departing from the spirit of the invention. For example, in steps 424 and 426, a new buffer is constructed to pass to the ASR. This can be avoided by using the circular buffer itself as the recognition buffer. This choice depends on details of the implementation platform. Similarly, this embodiment assumes a PUSH-ON, SILENCE-OFF microphone button paradigm. Other variations may be made for PUSH TO TALK, PUSH ON, PUSH OFF or other microphone button paradigms without straying from the spirit of the invention.

Figure 5:
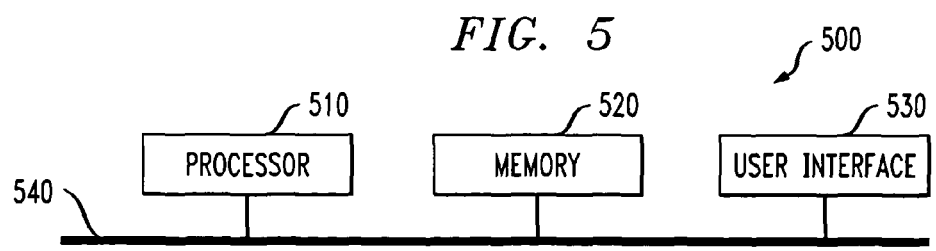
FIG. 5 is a diagram illustrating a computing system for use in implementing an anti-truncation buffering methodology, according to an embodiment of the invention.

Referring lastly to FIG. 5, a block diagram of an illustrative implementation of a computing system for use in implementing techniques of the invention is shown. More particularly, FIG. 5 represents a computing system 500 which may implement the anti-truncation buffering methodologies of the invention, as described above in the context of FIGS. 1 through 4. Computing system 500 may be used to implement all or part of the functions performed by the ASR, as well.

In this particular implementation, a processor 510 for controlling and performing methodologies described herein is coupled to a memory 520 and a user interface 530 via a computer bus 540.

It is to be appreciated that the term "processor" as used herein is intended to include any processing device, such as, for example, one that includes a CPU (central processing unit) or other suitable processing circuitry. For example, the processor may be a digital signal processor (DSP), as is known in the art. Also the term "processor" may refer to more than one individual processor. However, the invention is not limited to any particular processor type or configuration.

The term "memory" as used herein is intended to include memory associated with a processor or CPU, such as, for example, RAM, ROM, a fixed memory device (e.g., hard drive), a removable memory device (e.g., diskette), flash memory, etc. The circular and linear buffers may be implemented as part of memory 520. However, the invention is not limited to any particular memory type or configuration.

In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 530 may also include one or more microphones (and associated microphone activation buttons) for receiving user speech. However, the invention is not limited to any particular user interface type or configuration.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

In any case, while illustratively referred to in the above embodiments in the context of software, it should be understood that the components/steps illustrated in FIGS. 1 through 4 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for processing acoustic data in accordance with a speech recognition system, the method comprising acts of:
    recording acoustic data in at least one recording medium;
    detecting, at a first time, an indication to start speech recognition processing, the first time corresponding to a first location of the recorded acoustic data recorded in the at least one recording medium;
    determining whether the acoustic data recorded at the first time at which the indication to start speech recognition processing was detected is likely to be in a silence region or a speech region;
    if it is determined that the acoustic data recorded at the first time is likely to be in a speech region, analyzing at least some of the recorded acoustic data before the first location to determine a starting location for speech recognition processing; and
    if it is determined that the acoustic data recorded at the first time is likely to be in a silence region, analyzing the recorded acoustic data only after the first location to determine a starting location for speech recognition processing.

2. The method of claim 1, further comprising:
    starting speech recognition processing of the recorded acoustic data at the first location without accessing the recorded acoustic data before the first location to determine a starting location for speech recognition processing, when it is determined that the acoustic data recorded at the first time is likely to be in a silence region.

3. The method of claim 1, further comprising:
    identifying at least one silence-to-speech transition and at least one speech-to-silence transition in the recorded acoustic data, wherein the act of determining whether the acoustic data recorded at the first time is likely to be in a silence region or a speech region comprises determining whether a last transition before the first location is a silence-to-speech transition or a speech-to-silence transition.

4. The method of claim 1, further comprising:
    stopping speech recognition processing of the recorded acoustic data at a first speech-to-silence transition after the first location.

5. The method of claim 1, wherein the act of recording acoustic data in the at least one recording medium comprises:
    analyzing a portion of acoustic data recorded in the at least one recording medium to detect at least one silence-to-speech transition or at least one speech-to-silence transition in the portion of acoustic data recorded in the at least one recording medium; and
    storing an indication of a location of the detected at least one silence-to-speech transition or at least one speech-to-silence transition.

6. The method of claim 1, wherein the at least one recoding medium comprises a circular buffer and a linear buffer, and wherein the act of recording acoustic data in the at least one recording medium comprises:

recoding acoustic data in the linear buffer;
detecting whether the linear buffer is full; and
when it is detected that the linear buffer is full, appending at least some content of the linear buffer to the circular buffer and setting a current write position to a start of the linear buffer.

7. At least one computer readable memory encoded with instructions that, when executed, perform a method for processing acoustic data in accordance with a speech recognition system, the method comprising acts of:
recording acoustic data in at least one recording medium;
detecting, at a first time, an indication to start speech recognition processing, the first time corresponding to a first location of the recorded acoustic data recorded in the at least one recording medium;
determining whether the acoustic data recorded at the first time at which the indication to start speech recognition processing was detected is likely to be in a silence region or a speech region;
if it is determined that the acoustic data recorded at the first time is likely to be in a speech region, analyzing at least some of the recorded acoustic data before the first location to determine a starting location for speech recognition processing; and
if it is determined that the acoustic data recorded at the first time is likely to be in a silence region, analyzing the recorded acoustic data only after the first location to determine a starting location for speech recognition processing.

8. The at least one computer readable memory of claim 7, wherein the method further comprises:
starting speech recognition processing of the recorded acoustic data at the first location without accessing the recorded acoustic data before the first location to determine a starting location for speech recognition processing, when it is determined that the acoustic data recorded at the first time is likely to be in a silence region.

9. The at least one computer readable memory of claim 7, wherein the act of recording acoustic data in the at least one recording medium comprises:
analyzing a portion of acoustic data recorded in the at least one recording medium to detect at least one silence-to-speech transition or at least one speech-to-silence transition in the portion of acoustic data recorded in the at least one recording medium; and
storing an indication of a location of the detected at least one silence-to-speech transition or at least one speech-to-silence transition.

10. The at least one computer readable memory of claim 7, wherein the at least one recoding medium comprises a circular buffer and a linear buffer, and wherein the act of recording acoustic data in the at least one recording medium comprises:
recoding acoustic data in the linear buffer;
detecting whether the linear buffer is full; and
when it is detected that the linear buffer is full, appending at least some content of the linear buffer to the circular buffer and setting a current write position to a start of the linear buffer.

11. The at least one computer readable memory of claim 7, wherein the method further comprises:
identifying at least one silence-to-speech transition and at least one speech-to-silence transition in the recorded acoustic data, wherein the act of determining whether the acoustic data recorded at the first time is likely to be in a silence region or a speech region comprises determining whether a last transition before the first location is a silence-to-speech transition or a speech-to-silence transition.

12. The at least one computer readable memory of claim 7, wherein the method further comprises:
stopping speech recognition processing of the recorded acoustic data at a first speech-to- silence transition after the first location.

13. A system for processing acoustic data in accordance with a speech recognition system, the system comprising:
at least one memory for storing executable instructions;
at least one processor programmed by the executable instructions to:
record acoustic data in at least one recording medium;
detect, at a first time, an indication to start speech recognition processing, the first time corresponding to a first location of the recorded acoustic data recorded in the at least one recording medium;
determine whether the acoustic data recorded at the first time at which the indication to start speech recognition processing was detected is likely to be in a silence region or a speech region;
if it is determined that the acoustic data recorded at the first time is likely to be in a speech region, analyze at least some of the recorded acoustic data before the first location to determine a starting location for speech recognition processing; and
if it is determined that the acoustic data recorded at the first time is likely to be in a silence region, analyze the recorded acoustic data only after the first location to determine a starting location for speech recognition processing.

14. The system of claim 13, wherein the at least one processor is further programmed to:
start speech recognition processing of the recorded acoustic data at the first location without accessing the recorded acoustic data before the first location to determine a starting location for speech recognition processing, when it is determined that the acoustic data recorded at the first time is likely to be in a silence region.

15. The system of claim 13, wherein the at least one processor is further programmed to:
identify at least one silence-to-speech transition and at least one speech-to-silence transition in the recorded acoustic data; and
determine whether the acoustic data recorded at the first time is likely to be in a silence region or a speech region at least in part by determining whether a last transition before the first location is a silence-to-speech transition or a speech-to-silence transition.

16. The system of claim 13, wherein the at least one processor is further programmed to:
stop speech recognition processing of the recorded acoustic data at a first speech-to-silence transition after the first location.

17. The system of claim 13, wherein the at least one processor is further programmed to record acoustic data in the at least one recording medium at least in part by:
analyzing a portion of acoustic data recorded in the at least one recording medium to detect at least one silence-to-speech transition or at least one speech-to-silence transition in the portion of acoustic data recorded in the at least one recording medium; and
storing an indication of a location of the detected at least one silence-to-speech transition or at least one speech-to-silence transition.

18. The system of claim 13, wherein the at least one recoding medium comprises a circular buffer and a linear buffer, and wherein the at least one processor is further programmed to record acoustic data in the at least one recording medium at least in part by:
   recoding acoustic data in the linear buffer;
   detecting whether the linear buffer is full; and
   when it is detected that the linear buffer is full, appending at least some content of the linear buffer to the circular buffer and setting a current write position to a start of the linear buffer.

* * * * *